(12) United States Patent
Brittain et al.

(10) Patent No.: US 8,996,061 B2
(45) Date of Patent: Mar. 31, 2015

(54) BRIDGING COMMUNICATIONS BETWEEN TACTICAL SDR AND CELLULAR TELEPHONE NETWORKS

(71) Applicant: BAE Systems Information & Electronic Systems Integration Inc., Nashua, NH (US)

(72) Inventors: Keith Brittain, Newton, NJ (US); Louis R. Brothers, Vienna, VA (US); Sriram Chandrasekar, Washington, DC (US); Keith F. Conner, Boonton, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 449 days.

(21) Appl. No.: 13/624,285

(22) Filed: Sep. 21, 2012

(65) Prior Publication Data

US 2014/0087722 A1   Mar. 27, 2014

(51) Int. Cl.
*H04M 1/00* (2006.01)
*H04W 88/06* (2009.01)

(52) U.S. Cl.
CPC .................................. *H04W 88/06* (2013.01)
USPC .... 455/552.1; 455/426.1; 455/73; 455/575.1; 370/401

(58) Field of Classification Search
USPC ................... 455/73, 426.1, 426.2, 90.1–90.3, 455/575.1–575.9, 552.1, 553.1, 414.4
See application file for complete search history.

(56) References Cited

U.S. PATENT DOCUMENTS

| | | | | |
|---|---|---|---|---|
| 6,269,252 B1* | 7/2001 | Hutchings et al. | ......... | 455/552.1 |
| 6,278,697 B1* | 8/2001 | Brody et al. | .................. | 370/310 |
| 6,785,730 B1* | 8/2004 | Taylor | ........................... | 709/230 |
| 8,824,442 B2* | 9/2014 | Lea et al. | ...................... | 370/338 |
| 2002/0161907 A1* | 10/2002 | Moon | ........................... | 709/230 |
| 2009/0170444 A1* | 7/2009 | Retnasothie et al. | ........... | 455/73 |
| 2011/0131406 A1 | 6/2011 | Jones et al. | | |
| 2012/0136954 A1 | 5/2012 | Davis et al. | | |
| 2012/0140767 A1 | 6/2012 | Brothers et al. | | |
| 2012/0231787 A1 | 9/2012 | Conner et al. | | |
| 2013/0059556 A1* | 3/2013 | Molnar et al. | ............. | 455/234.1 |

OTHER PUBLICATIONS

Cummings Engineering, Secure Sleeve, on-line advertisement (one page)(undated).
Thread: Lockheed Martin MONAX System, Persistent Wireless Broadband Comm Network, on-line forum general discussion (three pages)(Aug. 12, 2010).
T. Mann, JTRS/WIN-T: Networking Waveform Quick Reference Sheets, Army Communicator (Jun. 2008).

* cited by examiner

*Primary Examiner* — Sharad Rampuria
(74) *Attorney, Agent, or Firm* — Leo Zucker

(57) ABSTRACT

A device for bridging communications between radios on a tactical network and telephones on a public cellular network. A dock region of the device housing receives and engages a given telephone that operates on the second network. A processing core of the device has (a) a core engine for receiving and transmitting first radio frequency (RF) signals on the first network, (b) digital signal processing stages for (i) translating first information modulated on the first RF signals into a format compatible with telephones on the second network, and producing corresponding translated first information, and (ii) translating second information demodulated by the given telephone from second RF signals on the second network into a format compatible with radios on the first network, and modulating the translated second information on the first RF signals transmitted by the core engine. An adapter provides an interface between the processing core and the given telephone.

16 Claims, 4 Drawing Sheets

BRIDGING COMMUNICATIONS BETWEEN TACTICAL SDR AND CELLULAR TELEPHONE NETWORKS

BACKGROUND OF THE INVENTION

1. Field of the Invention

The present invention relates to bridging communications between networks that follow different communications protocols.

2. Discussion of the Known Art

Most wireless handheld telephones or "smartphones" rely on public cellular telephone networks and commercial security for their operation. The telephones therefore have little if any potential for use in military or tactical applications. In addition, commercial off-the-shelf smartphones are not required to have the physical durability and battery capacity needed by the military, and they do not transmit or respond to various software defined radio (SDR) waveforms that are now being deployed on military communications networks. Unlike modern smartphones, however, the existing military handheld radios do not run useful applications such as, e.g., location based services with area maps that can provide a dismounted soldier with a high degree of situational awareness.

Accordingly, there is a need for an apparatus or device that effectively bridges the gap between current smartphones which are designed for operation over public cellular networks with limited security, and military handheld radios that are configured for use only on secure SDR networks. With such a device, a soldier could take advantage of the many useful applications and improved interfaces now residing in modern smartphones, and still have the ability to initiate and maintain reliable, secure ad-hoc communications on military networks using spectrum and waveforms defined by, e.g., the Joint Tactical Radio System (JTRS). Typical uses and bandwidth requirements for JTRS waveforms including WNW, SRW, NCW, HNW, and MUOS are disclosed in T. Mann, JTRS/WIN-T: Networking Waveform Quick Reference Sheets, on the Web at findarticles.com/p/articles/(Summer 2008), and incorporated by reference.

SUMMARY OF THE INVENTION

According to the invention, a device for bridging communications between radios operating on a first or tactical wireless network, and telephones operating on a second or public wireless network, includes a housing with a dock region dimensioned to receive and engage a given telephone configured to operate on the second network. A processing core in the housing has (a) a core engine operative to receive and to transmit first radio frequency (RF) signals on the first network wherein information is modulated on the first RF signals with a defined waveform, (b) one or more programmable digital signal processing (DSP) stages configured for (i) translating first information modulated on the first RF signals into a format compatible with telephones operating on the second network including the given telephone, and producing corresponding translated first information, and (ii) translating second information demodulated by the given telephone from second RF signals on the second network into a format compatible with radios operating on the first network, and modulating the translated second information on the first RF signals transmitted by the core engine with the defined waveform.

An adapter in the housing is constructed to provide an interface for sending the first translated information from the processing core to the given telephone, and for sending the second information demodulated by the given telephone to the processing core.

For a better understanding of the invention, reference is made to the following description taken in conjunction with the accompanying drawing and the appended claims.

DETAILED DESCRIPTION OF THE INVENTION

Figure 1:
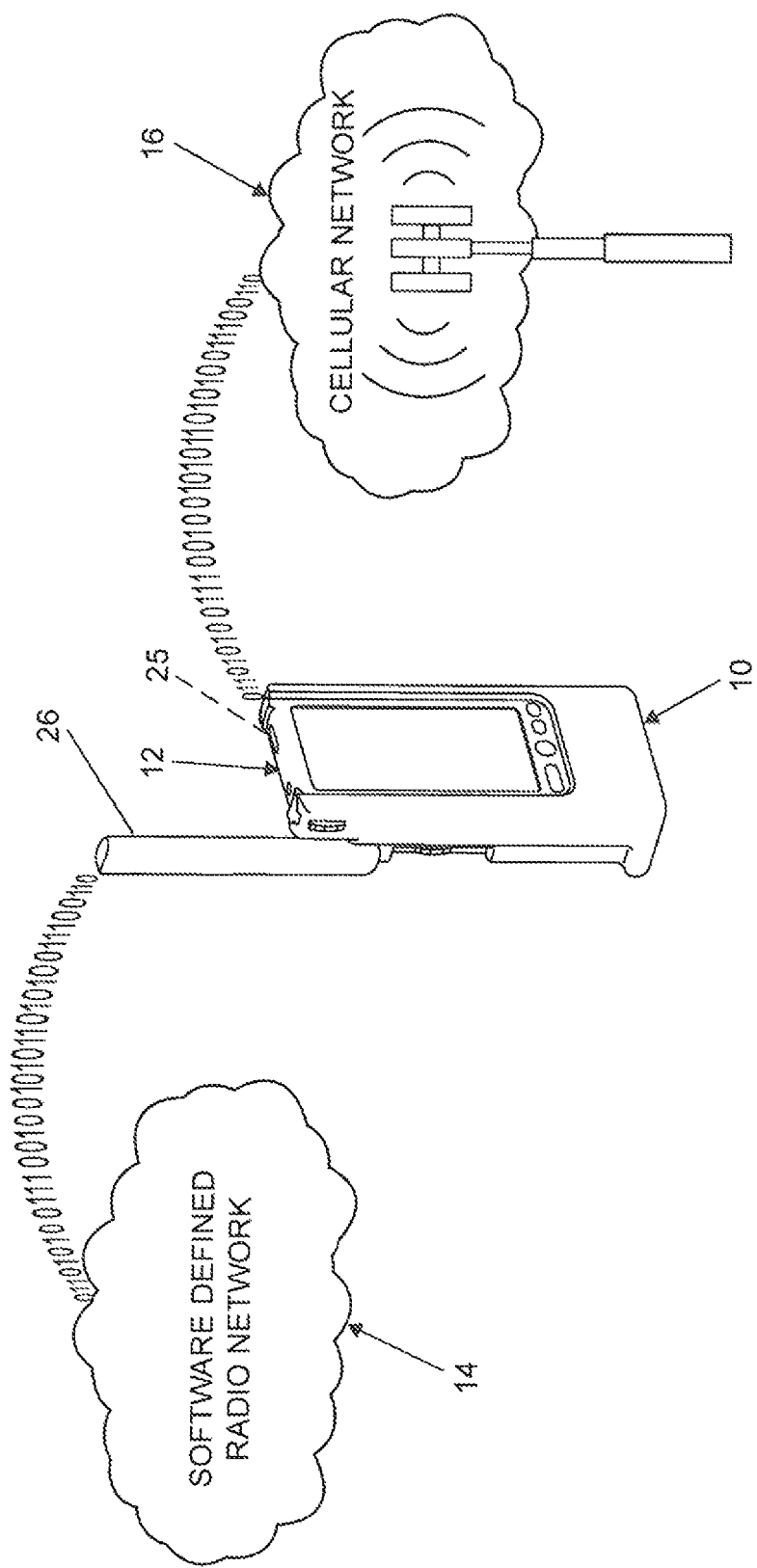
FIG. 1 shows the inventive device with a cellular telephone or smartphone inserted in the device, for bridging communications between a software defined radio (SDR) network and a cellular wireless network.

FIG. 1 shows a bridging device or sleeve 10 according to the invention, with a wireless telephone, e.g., a currently available smartphone 12 inserted in the sleeve 10 for operation. As mentioned, commercial smartphones alone have limited potential for military use because they operate only on publicly accessible wireless networks, their packaging is not durable or rugged enough to sustain various tactical field missions, and they lack sufficient battery capacity. The inventive sleeve 10 may therefore be characterized as a hardware applique that provides the smartphone 12 with a waveform capability for use on military networks, a security subsystem, additional battery capacity, and a rugged and protective handheld form factor. The sleeve 10 thus acts as a gateway between a software defined radio (SDR) military radio network 14 and a commercial cellular wireless telephone network 16 in the form of a self-contained, damage resistant handheld package.

As explained below, the sleeve 10 contains a radio frequency (RF) core engine and signal processing components such as disclosed, for example, in commonly owned U.S. patent application Ser. No. 13/465,977 filed May 7, 2012, and titled Extending the Upper frequency Limit of a Communications Radio, and Ser. No. 13/466,990 filed May 8, 2012, and titled Modular Core Engine (CE) Radio Architecture. Sleeve 10 also contains data translation and voice bridging components such as disclosed, for example, in commonly owned U.S. patent application Ser. No. 13/383,149 filed Feb. 1, 2012, and published as US 2012/0136954 on May 31, 2012; and Ser. No. 13/383,138 filed May 29, 2012, and published as US 2012/0231787 on Sep. 13, 2012. See also commonly owned U.S. patent application Ser. No. 13/383,113 filed Feb. 20, 2012, and published as US 2012/0140767 on Jun. 7, 2012. All relevant portions of the mentioned applications and publications are incorporated herein by reference.

Figure 2:
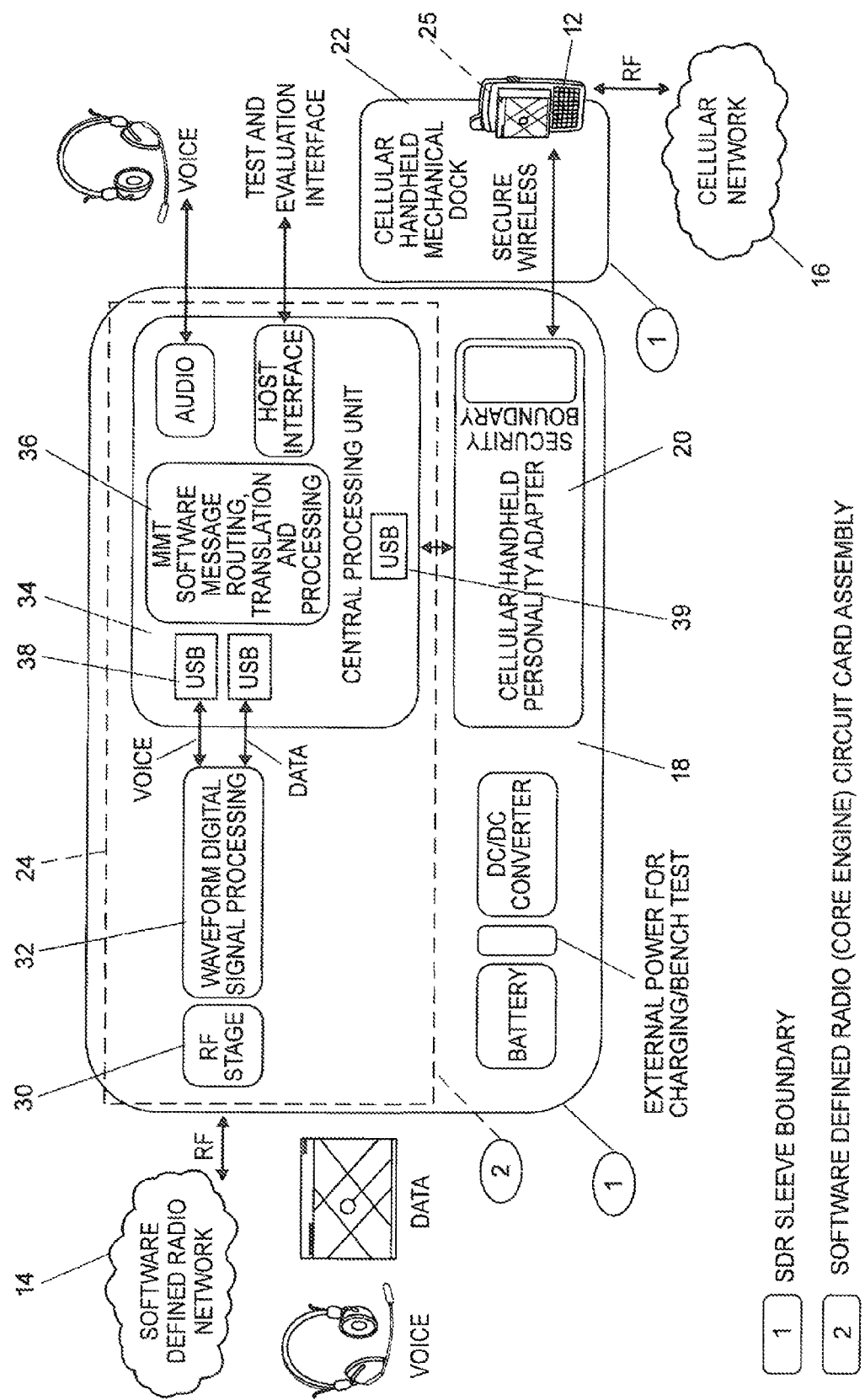
FIG. 2 is a schematic block diagram of the inventive device.

Specifically, and as shown in FIG. 2, the sleeve 10 has three major functional components, namely, a processing core 18, a cellular handheld personality adapter 20, and a mechanical dock 22 that is formed by the sleeve housing (see FIGS. 3 and 6) so that when the smartphone 12 is inserted in the dock 22, the smartphone becomes linked or bridged with the SDR network 14. To establish connectivity with the network 14, for example, a JTRS network using the Soldier Radio Waveform (SRW), the processing core 18 is programmed and configured in a known manner to provide modem capability for handling the defined SRW waveform parameters, and the data routing and retransmission protocols specified by the JTRS for the SRW. In addition, the processing core 18 is configured to provide message data translation and voice bridging functions sufficient to enable voice, text, and/or data transmissions originating from a user on one of the networks 14, 16, to be received and understood by an intended recipient(s) on the other network.

Figure 5:
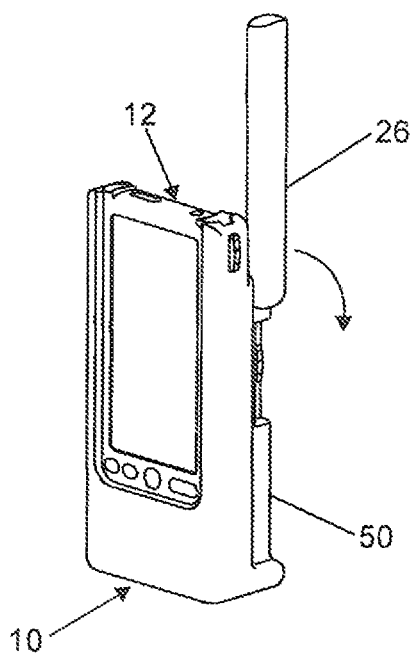
FIG. 5 is a front view of the inventive device with the inserted smartphone.

The personality adapter 20 in the sleeve 10 is configured in a known manner for secure communications with a given make and model of the smartphone 12 when the phone is inserted in the sleeve dock 22, so that information from the SDR network 14 is communicated from the processing core 18 to the smartphone 12 through the adapter 20, and is transmitted from the smartphone's own antenna 25 (which may be disposed internally of the phone) onto the cellular network 16 for reception by the intended cellular user. Likewise, voice or other data transmitted by a cellular user on the network 16 is received by the smartphone 12, and is communicated through the adapter 20 to the processing core 18 for transmission onto the SDR network 14 from another antenna 26 that may extended from the body of the sleeve 10 as shown in FIGS. 1 and 5. Known security policies are preferably associated with the message data translation and voice bridging functions running on the processing core 18, to ensure that only an intended recipient on one of the two networks 14, 16, will receive information originating from a user on the other network.

Processing Core 18

As represented in FIG. 2, the processing core 18 has a core engine (CE) 24 that is programmed and configured in a known manner to process advanced networking waveforms such as those specified by the JTRS. The CE 24 includes radio frequency (RF) receiver and transmitter stages 30, digital signal processing (DSP) stages 32, and a powerful processing core 34. In addition to handling a given waveform, the CE 24 also hosts a multi-message translator or MMT component 36 (see the mentioned Application Pub. No. US 2012/0140767 and International Application PCT/US/2011/033548) and provides such data translation and routing as needed to transfer messages or other information between the disparate networks 14, 16.

The MMT component 36 and an associated voice bridge gateway (see the '548 IA) enable situational awareness, command and control, and voice to be disseminated across both the military SDR network 14 and the commercial cellular network 16, notwithstanding that each network follows different protocols with respect to message formatting, transport, RF spectrum, and waveforms. The MMT component 36 preferably supports both event and polling based message distribution, and has a modular architecture that allows rapid hosting of new messages structures. Open-standard message formats may then be readily incorporated, for example and without limitation, DL-J/Link 16, JREAP C, Variable Message Format (VMF), Cursor-on Target (CoT), UDP, TCP, IPv4, and IPv6. The MMT component 36 may also be configured to support proprietary message formats for unique customer communities.

Accordingly, the sleeve 10 is a self-contained device that provides a solution for bridging voice, data, and text between military SDR and commercial cellular telephone networks.

The following example illustrates the flow of data from the SDR network 14 to the cellular network 16.

Example

It is assumed that available and appropriate waveform and MMT software are loaded in the processing core 34, and that the smartphone 12 and the core engine 24 of the sleeve 10 are wirelessly paired (e.g., via Bluetooth™) through the personality adapter 20 when the smartphone is inserted in the sleeve dock 22. It is also assumed that information is sourced from a military handheld radio or node on the SDR network 14, and that the recipient or destination node is a user on the cellular network 16. It will be understood that information may also be re-routed securely back from the destination node on the cellular network 16 to the originating node on the SDR network 14, or used locally by the smartphone 12 at the sleeve 10.

Source information originating from the SDR network 14 may be in the form of digitized voice, text, or data transmitted wirelessly over one or more specified RF channels of the network 14. The source information is received over the air via the sleeve antenna 26, and is coupled to a front end of the RF stage 30 in the core engine 24 of the processing core 18. The information is demodulated and converted into a baseband data stream by the digital signal processing stages 32 in the CE 24. The data stream is passed via, e.g., a USB (Universal Serial Bus) interface 38 to the processing core 34, and decisions concerning a final destination of the information on the cellular network 16 are determined by the MMT component 36.

Once a destination node (an intended recipient) on the cellular network 16 is determined, the demodulated data stream is translated and repackaged by the MMT component 36, and is transferred via, e.g., a USB interface 39, to the personality adapter 20 in the sleeve 10. As mentioned, the adapter 20 is constructed and arranged in a known manner to establish a secure wireless connection or interface through which the processing core 18 and the smartphone 12 can communicate with one another.

When the translated data stream from the processing core 18 is input to the personality adapter 20, the adapter operates to convert the data stream to a secure wireless protocol for which the smartphone 12 may be equipped, e.g., Bluetooth, Suite B. The adapter 20 then transmits the data stream wirelessly at a low signal strength for reception by the smartphone 12 within the sleeve dock 22. Alternatively or in addition, for phones provided with a mini-USB, micro-USB, or other wire interface through which the data stream may be input to the phone, the personalty adapter 20 can include a corresponding mating connector to enable a hard wire transfer of streams of voice or text data to and from the phone.

As mentioned, information that is sourced from the SDR network 14 is translated by the MMT component 36 in the sleeve core engine 24 so that the information can be received and used by an intended recipient on the cellular network 16. For two-way voice communications, the intended recipient's cellular telephone may not require any additional software or modification. For data communications, however, the recipient's telephone may require a corresponding application (i.e., a MMT "client") in order to process and use the received data.

For example, in a situational awareness scenario, location information in the form of GPS data that is sourced from a node on the SDR network 14 would not be useful to a recipient on the cellular network 16, without an application on the recipient's phone that will route the information to special mapping software previously loaded in the phone. As mentioned, message translation policies can assure that only designated authorized users on the cellular network 16 will receive and use any information that originates from the SDR network 14.

Sleeve Dock 22

Most current smartphones are equipped with a secure wireless interface (e.g., Bluetooth) so that the phones can communicate (or "pair") with similarly equipped devices. Using such an interface as a transport layer between the processing core 18 of the sleeve 10 and the smartphone 22 when the phone is placed in the sleeve dock 22 allows data from/to the SDR network 14 to be readily and securely transferred to/from the smartphone 12, and for a user to insert or remove the smartphone 12 easily with respect to its operating position in the dock 22, as desired.

Figure 3:
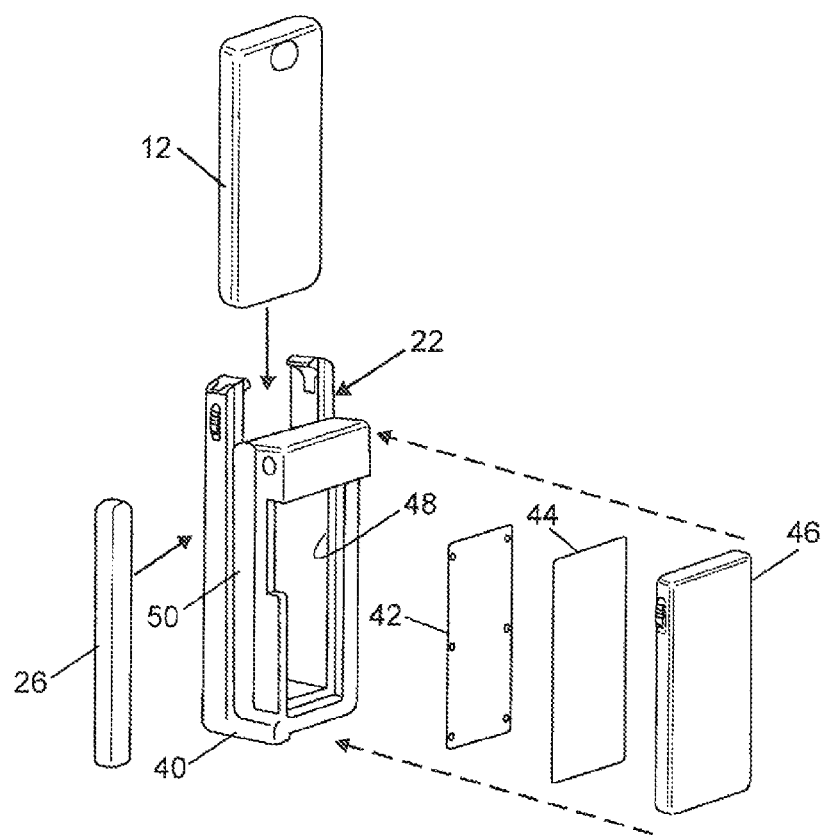
FIG. 3 is an assembly view of the inventive device.
Figure 4:
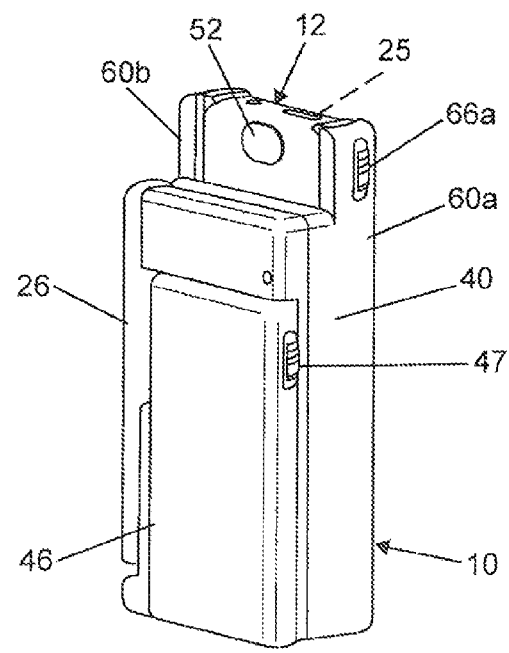
FIG. 4 is a rear view of the inventive device with the inserted smartphone.

FIGS. 3 to 6 show further details of the sleeve 10 including a housing 40 that is dimensioned and arranged to form the sleeve dock 22, a circuit card assembly (CCA) 42 that contains the processing core 18, an environmental seal 44, and a high-capacity (e.g., Li-Ion), small and light weight battery pack 46. For ruggedness, the material of the housing 40 is preferably a durable molded resin, e.g., a mixture of a polymer and machined aluminum. As shown in FIGS. 3 and 4, the battery pack 46 can be dimensioned and configured to be fastened to a rear surface of the housing 40 using, e.g., a conventional button-operated latch 47 (FIG. 4), and to enclose the CCA 42 protectively with the seal 44 inside a recessed compartment 48 formed in the housing 40. Further, the sleeve antenna 26 can be mounted on the sleeve housing 40 so as to pivot about its base between an extended position such as shown in FIG. 5, and a position shown in FIG. 4 at which the antenna 26 is stored in a recess 50 formed along a side of the housing 40.

Also, the housing 40 including the dock 22 is dimensioned and arranged so that the field of view of a camera lens 52 on the smartphone 12 is not obstructed by the housing when the phone is fully inserted in the dock 22. See FIG. 4. This enables the smartphone 12 to record and transmit video data obtained through the lens 52 over both of the networks 14, 16.

Figure 6:
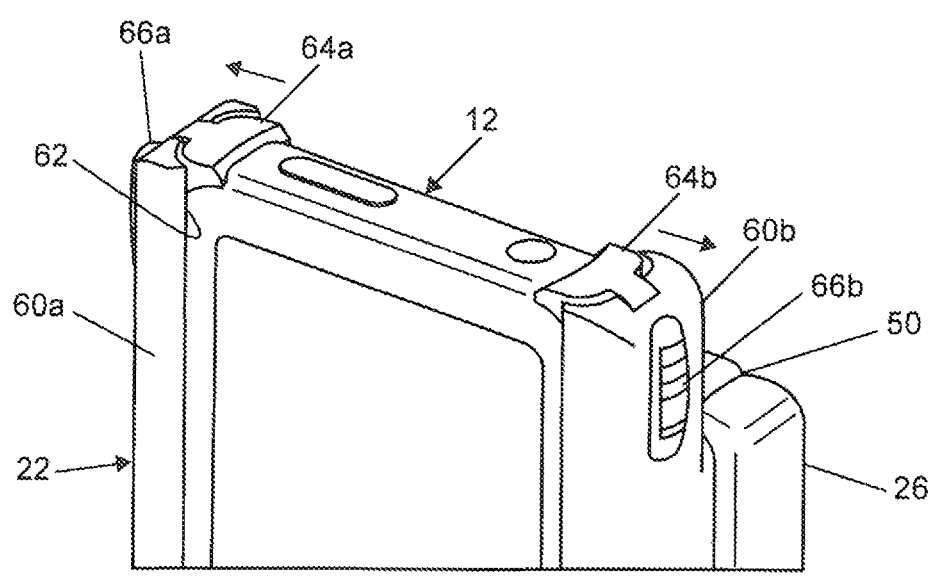
FIG. 6 is an enlarged view of a top portion of the device in FIG. 5, showing a mechanism for latching the smartphone in an operating position within the device.

FIG. 6 shows a latching mechanism for retaining the smartphone 12 once inserted in the dock 22, and for allowing the phone to be withdrawn easily when desired. Specifically, and as shown in FIGS. 4 and 6, the sleeve housing 40 forms a pair of vertical guide channels 60a, 60b, that extend upward from a bottom end of the housing and at opposite sides of the housing. The top ends of the channels 60a, 60b, define a dock opening 62 through which the smartphone 12 can be inserted at its bottom edge, and guided by the channels 60a, 60b, to a position where the phone is operatively coupled or connected (e.g., via Bluetooth or a hardwire connector) with the personality adapter 20. A pair of spring loaded latch fingers 64a, 64b, are mounted at the top ends of the channels 60a, 60b, and the fingers 64a, 64b, are linked in a known manner with corresponding operating buttons 66a, 66b, at the sides of the channels.

By urging the buttons 66a, 66b, downward, the latch fingers 64a, 64b, swing upward and clear of the dock opening 62 to allow the smartphone 12 to be inserted fully into the dock 22. When the smartphone 12 is at the operating position in the dock 22, the buttons are released and the latch fingers swing downward to capture the top corners of the phone and thus retain the phone at the operating position. The smartphone 12 can later be withdrawn from the sleeve dock 22 easily by urging the buttons 66a, 66b, downward to disengage the latch fingers 64a, 64b, from the corners of the smartphone.

While the foregoing represents preferred embodiments of the invention, it will be understood by those skilled in the art that various modifications, additions, and changes may be made without departing from the spirit and scope of the invention, and that the invention includes all such modifications and changes as are within the scope of the following claims.

We claim:

1. A device for bridging communications between radios operating on a first wireless network, and telephones operating on a second wireless network, comprising:
 a housing including a dock region dimensioned and arranged for receiving a given telephone configured to operate on the second wireless network, and for retaining the telephone at an operating position in the dock region;
 a processing core contained in the housing and including (a) a core engine operative to receive and to transmit first radio frequency (RF) signals on the first wireless network wherein information is modulated on the first RF signals with a defined waveform in a first format, (b) one or more programmable digital signal processing (DSP) stages configured for (i) translating first information modulated on the first RF signals in the first format into a second format compatible with telephones operating on the second wireless network including the given telephone, and producing corresponding translated first information, (ii) translating second information demodulated by the given telephone from second RF signals on the second wireless network into the first format to be compatible with radios operating on the first wireless network, and (iii) modulating the translated second information on the first RF signals transmitted by the core engine with the defined waveform in the first format; and
 an adapter associated with the housing and constructed and arranged to provide an interface for sending the first translated information from the processing core to the given telephone, and for sending the second information demodulated by the given telephone to the processing core, when the given telephone is set at the operating position in the dock region of the housing;
 wherein the core engine of the processing core is programmed and configured to receive and to transmit the first RF signals on the first wireless network in the form of software defined radio (SDR) waveforms; and
 the SDR waveforms include waveforms defined by the Joint Tactical Radio System (JTRS).

2. A device according to claim 1, wherein the interface provided by the adapter is wireless.

3. A device according to claim 2, wherein the wireless interface provided by the adapter includes a secure wireless protocol.

4. A device according to claim 1, wherein the interface provided by the adapter is wired.

5. A device according to claim 1, wherein the housing forms a pair of vertical guide channels that extend upward from a bottom end of the housing and at opposite sides of the housing, and top ends of the channels define an opening for the dock region for receiving the given telephone so that the telephone is guided by the channels to the operating position with respect to the adapter associated with the housing.

6. A device according to claim 5, comprising a latching mechanism for retaining the given telephone in the operating position in the dock region of the housing.

7. A device according to claim 6, wherein the latching mechanism comprises a pair of latch fingers mounted at top ends of the guide channels adjacent to the dock opening for capturing the given telephone at the operating position.

8. A device according to claim 7, wherein the latch fingers are pivoted on the guide channels for swinging movement into and out of the dock opening.

9. A device for enabling communications between radios operating on a first wireless network, and a telephone associated with a second wireless network, comprising:
 a housing including a dock region dimensioned and arranged for receiving a given telephone associated with the second wireless network, and for retaining the telephone at an operating position in the dock region;
 a processing core contained in the housing and including (a) a core engine operative to receive and to transmit first radio frequency (RF) signals on the first wireless network wherein information is modulated on the first RF signals with a defined waveform in a first format, (b) one or more programmable digital signal processing (DSP) stages configured for (i) translating first information modulated on the first RF signals received by the core engine in the first format, into a second format compatible with telephones associated with the second wireless network including the given telephone, and producing corresponding translated first information, (ii) translating second information obtained by the given telephone in the second format into the first format for compatibility with radios operating on the first wireless network, and (iii) modulating the translated second information on the first RF signals transmitted by the core engine with the defined waveform in the first format; and
 an adapter associated with the housing and constructed and arranged to provide an interface for sending the first translated information from the processing core to the given telephone, and for sending the second information obtained by the given telephone to the processing core, when the given telephone is set at the operating position in the dock region of the housing;
 wherein the core engine of the processing core is programmed and configured to receive and to transmit the first RF signals on the first wireless network in the form of software defined radio (SDR) waveforms; and
 the SDR waveforms include waveforms defined by the Joint Tactical Radio System (JTRS).

10. A device according to claim 9, wherein the interface provided by the adapter is wireless.

11. A device according to claim 10, wherein the wireless interface provided by the adapter includes a secure wireless protocol.

12. A device according to claim 9, wherein the interface provided by the adapter is wired.

13. A device according to claim 9, wherein the housing forms a pair of vertical guide channels that extend upward from a bottom end of the housing and at opposite sides of the housing, and top ends of the channels define an opening for the dock region for receiving the given telephone so that the telephone is guided by the channels to the operating position with respect to the adapter associated with the housing.

14. A device according to claim 13, comprising a latching mechanism for retaining the given telephone in the operating position in the dock region of the housing.

15. A device according to claim 14, wherein the latching mechanism comprises a pair of latch fingers mounted at top ends of the guide channels adjacent to the dock opening for capturing the given telephone at the operating position.

16. A device according to claim 15, wherein the latch fingers are pivoted on the guide channels for swinging movement into and out of the dock opening.

* * * * *